United States Patent [19]

David

[11] Patent Number: 4,588,576

[45] Date of Patent: * May 13, 1986

[54] PRODUCTION OF MICROCRYSTALLINE ZIRCONIA

[75] Inventor: Lawrence D. David, Wappingers Falls, N.Y.

[73] Assignee: Celanese Corporation, New York, N.Y.

[*] Notice: The portion of the term of this patent subsequent to May 28, 2002 has been disclaimed.

[21] Appl. No.: 765,691

[22] Filed: Aug. 15, 1985

Related U.S. Application Data

[62] Division of Ser. No. 667,303, Nov. 1, 1984.

[51] Int. Cl.$^4$ .......................... B22F 9/24; C01G 1/02; C01G 25/02; C04B 35/26
[52] U.S. Cl. ..................................................... 423/608
[58] Field of Search ........................................ 423/608

[56] References Cited

U.S. PATENT DOCUMENTS 4,520,114  5/1985  David ................................. 423/608

*Primary Examiner*—Howard S. Williams
*Attorney, Agent, or Firm*—Dapaoli & O'Brien

[57] ABSTRACT

This invention provides a process for production of a microcrystalline metal oxide having an average particle size less than about 1000 angstroms.

An important feature of the invention process involves the application of ultrasonic wave energy during the stage that a solution of metal organic compounds is being treated to form a gelled solution. The ultrasonic energy input during the gelling stage enhances the production of a high purity metal oxide powder having fine grain particles of uniform microspheric dimensions.

8 Claims, No Drawings

PRODUCTION OF MICROCRYSTALLINE ZIRCONIA

This is a division of application Ser. No. 667,303 filed Nov. 1, 1984.

BACKGROUND OF THE INVENTION

Finely divided oxide powders are useful in the manufacture of coating compositions, intricately shaped and fine-grained ceramics, cermets, and the like. Small particles are particularly important in the preparation of powder mixtures. In general, the smaller the particle size, the more uniform are the compositions and the better the mechanical properties of metal, ceramic, and cermet articles prepared from the powder mixtures. There is further advantage if the fine-grain particles have equiaxed dimensions, i.e., the particles are substantially microspheric in shape.

A variety of techniques have been attempted for the production of inorganic powders that are characterized by particles which are fine grained and microspheric in dimensions. Grinding of inorganic powders can result in very fine particles, but conchoidal fracture and other cleavage effects during grinding yield particles with sharp edges and jagged contours.

Shock cooling, spray drying, and prilling also have been investigated for this purpose. In most cases these methods provide powder particles that have one or more undesirable physical properties such as porosity, nonuniformity of particle size and shape, lack of crystal homogeneity, and the like.

A recent development has been the study of sonication as a prospective energy source relative to physicochemical phenomena.

As described in publications such as J. Appl. Phys., 37, 254(1968), it has been recognized that nucleation of a crystal in an undercooled liquid can be induced by cavitation. The cavities are small voids in the liquid which open in negative pressure regions, as can be produced by ultrasonic wave energy. High local pressures result when the cavities collapse. It appears that most forms of mechanical disturbance nucleate by creating cavities which collapse to produce the nuclei. It has been observed that an ultrasonic field which produces cavitation in the vicinity of growing crystals can cause extensive fracturing of the crystals. Ultrasonic irradiation of castings has been utilized to achieve grain refinement.

Ukr. Khim. Zh., 43(12), 1285(1977) describes a study involving the use of an ultrasonic field as an analytical tool to monitor the gelling of a sodium silicate solution.

Chemical Week (page 29, Jan. 18, 1984) reports the growing interest in the potential utilization of sonication in chemical processes, such as palladium-catalyzed alkyne and alkene hydrogenation, Friedel-Crafts acylation of aromatic compounds to produce ketones, reduction of nitro compounds to anilines, zinc-catalyzed condensation of carbonyl compounds and bromoesters to beta-hydroxyesters, and the like.

Prior art of more specific interest with respect to the present invention are various processes disclosed in the United States patent literature.

U.S. Pat. No. 3,222,231 describes a process which involves the physical precipitation of a solid solute (e.g., ammonium perchlorate) out of solution while simultaneously subjecting the solution to both mechanical agitation and high frequency vibration.

U.S. Pat. No. 3,249,453 describes a process for producing finely-dispersed dyestuffs and pigments which involves initially forming particles of a dyestuff or pigment in statu nascendi (i.e., by precipitation from a solution) in an ultrasonic field having at the locus of formation a maximum of sound intensity, and thereafter exposing the color component to a zone of decreasing sound intensity.

U.S. Pat. No. 3,408,304 describes a process for preparing an oxide nuclear fuel material which involves the steps of forming a slurry of actinide precipitate, and then converting the slurry of actinide precipitate to a sol by peptizing the slurry with the aid of ultrasonic wave energy.

U.S. Pat. No. 3,617,584 describes a process for preparing spherical particles from an aqueous feed of dispersed metal oxide such as uranium oxide or plutonium oxide, which involves subjecting the aqueous feed to sonic vibrations of predetermined frequency and amplitude.

There is continuing interest in the prospective advantages of new and improved applications of sonication to physicochemical transformations.

Accordingly, it is an object of this invention to provide an improved process for production of microcrystalline inorganic oxide powders.

It is another object of this invention to provide a process which employs ultrasonic wave energy for the production of fine grain metastable tetragonal zirconia powder which is free of monoclinic and cubic phase crystal structures.

It is another object of this invention to provide a process which employs ultrasonic wave energy for the production of a fine grain ferrimagnetic spinel composition having a ferrite crystal lattice structure of improved dimensional stability and strength.

Other objects and advantages of the present invention shall become apparent from the accompanying description and examples.

DESCRIPTION OF THE INVENTION

One or more objects of the present invention are accomplished by the provision of a process for the production of a microcrystalline metal oxide powder which comprises (1) forming a homogeneous solvent solution containing a solute of one or more metalorganic compounds; (2) subjecting the solution to ultrasonic wave energy, while treating the said solution to cause formation of a gelled solution; (3) removing solvent medium from the gelled solution to provide a residual mass of precursor solids; and (4) pyrolyzing the precursor solids in the presence of molecular oxygen to form a metal oxide composition having an average particle size less than about 1000 angstroms.

The ultrasonic wave energy can be provided by any conventional system, such as an aqueous bath equipped with a source of high frequency vibrations. Any acoustic generator can be employed, e.g., a piezoelectric type or a magnetorestrictive type.

Illustrative of a sonic source is a quartz oscillator which is energized by an alternating current generator or a magnetic coil actuating a membrane. A laboratory cleaner apparatus (117 V, 150 W) with a 40–55 kilohertz(kHz) sonic generator is suitable as an ultrasonic system for present invention process embodiments.

A suitable ultrasonic wave energy frequency will vary in the range between about 15–3000 kHz, and typically will be in the range between about 40–2000 kHz. The ultrasonic intensity will vary in the range between about 20–500 watt/cm$^2$.

Illustrative of metalorganic compounds which can be utilized in the invention process are metal β-diketonates, metal carboxylate salts, metal alkoxides, and the like.

Suitable compounds include nickel, zinc, iron and zirconium acetylacetonates, acetates, benzoates, methoxides, isopropoxides, and the like.

The solution medium employed in step(1) of the invention process can be any solvent which is capable of dissolving or solvating the mixture of metalorganic starting compounds. Typical solution media besides water include ' aliphatic and aromatic solvents such as methanol, ethylene glycol, acetone, diisopropyl ether, tetrahydrofuran, dimethylformamide, dichloroethylene, carbon tetrachloride, hexane, benzene, toluene, and the like. Mixtures of organic solvents can be employed, and water-miscible organic solvents can be used in the form of aqueous mixtures.

When the metalorganic compounds in step(1) are acetylacetonates, the preferred solvent is tetrahydrofuran since it enhances the subsequent formation of a homogeneous gel in step(2) of the process.

The concentration of the formed solution in step(1) is not critical, and can vary over a broad range between about 2–60 weight percent, and on the average will be in the range between about 10–50 weight percent, based on solution weight.

The ultrasonic wave energy imput is applied during the step(2) treatment of the solution that forms the gelled solution, e.g., over a period between about 0.2–1 hour. Preferably the gelled solution is maintained in the ultrasonic field for an additional period of about 0.1–2 hours.

The treatment applied to effect gellation in step(2) usually will involve cooling the solution medium, or concentrating the solution medium by solvent removal, or adding a gelling agent to the solution medium, or a combination of such procedures.

After the step(2) gelling phase is completed, the solvent medium is removed from the gelled solution, and the resultant mass of precursor solids is subjected to one or more additional processing steps which include pyrolysis of the precursor solids in the presence of molecular oxygen to form a metal oxide having an average particle size of less than about 1000 angstroms. More specific processing embodiments are elaborated more fully hereinafter. The inclusion of a surfactant in a present invention solution medium provides an additional degree of improved properties in the final metal oxide product.

An important aspect of the present invention process embodiments is the production of fine grain metal oxide particles which are microspheric in dimensions. The ultrasonic field which is applied to the gelling phase in step(2) promotes thorough mixing of the gel components, prevents gross agglomeration of the gel solids, and fractures and shapes the gel solids into a homogeneous dispersion of fine microspheric particles.

Production Metastable Tetragonal Zirconia

In one embodiment, the present invention provides a process for the production of microcrystalline metastable tetragonal zirconia which comprises (1) preparing a homogeneous solution by dissolving in a solvent medium zirconium β-diketonate and a metastabilizing quantity of metal β-diketonate selected from alkaline earth and lanthanide metal β-diketonates; (2) subjecting the solution to ultrasonic wave energy, while treating the said solution to cause formation of a gelled solution; (3) removing the solvent medium to provide a residual mass of precursor solids; (4) pyrolyzing the precursor solids in an inert atmosphere at a temperature between about 300°–900° C. until the presursor solids have a carbon content between about 1–10 weight percent, based on the weight of precursor solids; and (5) calcining the precursor solids in the presence of molecular oxygen at a temperature between about 300°–900° C. to yield metastable tetragonal zirconia powder having an average particle size less than about 1000 angstroms.

The present invention further contemplates the inclusion of a surfactant in step(1) of the above-described process embodiment. The surfactant is employed in a quantity between about 0.01–20 weight percent, preferably between about 1–15 weight percent, based on the β-diketonate content of the step(1) solution.

A present invention metastable tetragonal zirconia powder has a crystal structure which is a solid solution of zirconium dioxide and a metastabilizing quantity between about 1–30 mole percent of metal oxide selected from alkaline earth and lanthanide metal oxides, and further characterized by:

(a) a crystallite size up to about 500 angstroms;

(b) an average particle size less than about 1000 angstroms;

(c) particles of equiaxed dimensions; and (d) a substantial absence of monoclinic and cubic phase crystal structures as determined by x-ray diffraction pattern analysis.

The term "metastable" as employed herein refers to zirconia which has a partially stabilized tetragonal phase crystal structure. By the term "partially stabilized" is meant a tetragonal phase crystal structure which is capable of martensitic transformation to the monoclinic phase crystal structure under stress-inducing conditions such as ball-milling at 25° C.

The term "metastabilizing" quantity as employed herein generally refers to an amount between about 1–30 mole percent of stabilizer metal oxide in solid solution with the zirconium oxide. The optimal metastabilizing quantity of metal oxide stabilizer varies depending on the particular metal oxide being employed, as determined experimentally.

Illustrative of suitable β-diketonate chelating entities for use in the invention embodiments are aliphatic compounds corresponding to the formula:

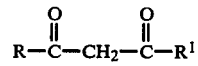

where R and R$^1$ are alkyl or substituted alkyl groups containing between about 1–10 carbon atoms. R and R$^1$ can also be aryl or substituted aryl groups. The preferred β-diketonate chelating agent is acetylacetone:

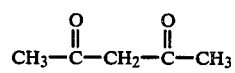

The stabilizer metal β-diketonate is selected from alkaline earth and lanthanide metal β-diketonates. Illustrative of alkaline earth metals are Group II metals such as magnesium, calcium, strontium, and the like. Illustrative of lanthanide metals are yttrium, lanthanum, and type 4f rare earth metals of atomic number 58–71, such as cerium, dysprosium, and ytterbium.

The solvent medium employed to prepare the solution of metal β-diketonates can be selected from any of a wide variety of conventional solvent types which have acceptable solvating properties and which are inert with respect to the solute content. Suitable solvents include alcohols, ketones, ethers, hydrocarbons, halocarbons, and the like, as previously described.

Depending on the particular metal β-diketonates and the particular solvent medium being utilized, the maximum concentration of the step(1) solution will vary between about 2–30 weight percent of metal β-diketonates, based on total solution weight.

The dissolution of the metal β-diketonates in the solvent medium can be facilitated by heating the admixture at reflux temperature for a short period. The addition of a small quantity of concentrated ammonium hydroxide to the admixture aids in clarifying the solution medium, and it appears to enhance the homogeneity of the final metastable tetragonal zirconia product.

There is also particular advantage for purposes of optimizing the properties of the zirconia product to include a surfactant in the step(1) solution medium. The effect of the surfactant is to provide a zirconia product which is a finer, more monodisperse powder with particles of equiaxed dimensions, and which is substantially agglomerate-free as compared to a zirconia product prepared without a surfactant. The average particle size of the surfactant-enhanced zirconia product is less than about 1000 angstroms in diameter, e.g., between about 700–800 angstroms.

Illustrative of suitable surfactants for the present invention embodiments are nonionic surface active agents such as sorbitan fatty acid esters, polyoxyethylene sorbitan fatty acid esters, polyoxyethylene sorbitol fatty acid esters, polyoxyethylene fatty acid esters, polyoxyethylene alcohol ethers, glycerine fatty acid esters, propylene glycol fatty acid esters, polyoxyethylene-castor oil derivatives, polyoxyethylene alkyl phenyl ethers, alkyl esters of phosphoric acid, polyoxyethylene esters of phosphoric acid, polyvinyl alcohol, and the like; anionic surface active agents such as salts of alkyl sulfates, salts of polyoxyethylene alkyl ether sulfate, salts of alkyl sulfosuccinates, N-acylsarcosine salts, fatty acid salts, homopolymers and copolymers of unsaturated carboxylic acids such as acrylic acid and maleic acid, and the like; and cationic surface active agents such as quaternary ammonium salts and pyridinium salts, and the like.

The application of ultrasonic wave energy and the specific treatment to effect gellation in step(2) are conducted in the manner previously described.

The removal of the solvent medium from the solution in step(3) of the process is accomplished by any convenient means, such as evaporation or vacuum distillation, to provide a residual mass of precursor solids. The residual mass usually has the appearance and consistency of a firm gel.

An essential aspect of this process embodiment is the two stage thermolysis treatment of the precursor solids as defined in steps(4) and (5) of the process. In the first stage the precursor solids are pyrolyzed in an inert atmosphere at about 300°–900° C. until the precursor solids have a carbon content between about 1–10 weight percent. The pyrolysis period generally will vary between about 0.2–1 hour. If desired the pyrolysis can be conducted in two or more cycles, with an intervening ball-milling of the glassy char precursor solids. The preferred inert atmosphere is nitrogen, argon, or helium.

It has been found that the presence of carbon in the pyrolyzed precursor solids has a beneficial effect on the final zirconia product properties. The stabilization of the zirconia product in a pure tetragonal phase crystal structure is enhanced if the inert atmosphere pyrolyzed precursor solids provided in step(4) contain between about 1–10 weight percent of carbon.

In the second stage of the thermolysis treatment, the pyrolyzed precursor solids are calcined in the presence of molecular oxygen in step(5) of the process embodiment. The calcination is conducted at about 300°–900° C. for a period between about 0.1–1 hour until the resultant metastable tetragonal zirconia is carbon-free. It is advantageous to calcine the precursor solids in air, and then subsequently in an atmosphere of pure oxygen. The resultant zirconia powder has an average particle size less than about 1000 angstroms in diameter.

An x-ray diffraction analysis of the zirconia product indicates that it is substantially pure phase tetragonal zirconia, without any separate x-ray pattern lines for monoclinic and cubic phases, or any separate lines for the metal oxide stabilizer additive.

The metastability of the tetragonal phase crystal structure is demonstrated by the relative ease with which the zirconia powder transforms to the monoclinic phase crystal structure when the zirconia powder is subjected to stress-inducing energy input by ball-milling at room temperature.

Production Ferrimagnetic Spinel Compositions

In another embodiment, this invention provides a process for the production of a microcrystalline ferrimagnetic spinel which comprises (1) forming a solvent solution containing metalorganic compounds in quantities and with metal valences that subsequently yield a spinel product corresponding to the formula:

$M_1Fe_2O_4$ where M is manganese, iron, cobalt, nickel, copper, zinc, cadmium, magnesium, barium, strontium, or any combination thereof; (2) subjecting the solution to ultrasonic wave energy, while treating the solution with ammonia or an organic amine to cause formation of a gelled solution; (3) removing solvent medium from the gelled solution to provide a solid-phase spinel precursor; and (4) pyrolyzing the spinel precursor in the presence of molecular oxygen at a temperature in the range between about 300°–900° C. to form a $M_1Fe_2O_4$ spinel composition having an average particle size less than about 1000 angstroms.

The types of suitable solvents and metalorganic compounds, and the means of ultrasonic wave energy input, are as previously described.

The concentration of the formed solution in step(1) is not critical, and can vary over a broad range between about 2–60 weight percent of metalorganic solute, and on the average will be in the range between about 10–50 weight percent, based on solution weight.

Preferably, the formed solution is heated at a temperature between about 50°–150° C., usually at a temperature between about 60°–90° C., for a period between about 0.1–10 hours, usually for a period between about 0.5–2 hours.

After the heating period is completed, the solution is cooled to ambient temperature and treated with ammonia or an organic amine to cause formation of a gelled solution. The gelling reaction is exothermic, and it is usually necessary to add the basic reagent slowly with stirring to prevent an uncontrolled temperature increase. With some gelling media the application of cooling may be desirable during the addition of the basic reagent.

The ammonia can be introduced as a gas, or in the form of an aqueous ammonium hydroxide solution. Alternatively, an organic amine can be employed as the basic reagent. Suitable organic amines include methylamine, diethylamine, tributylamine, triphenylamine, tetramethylammonium hydroxide, pyridinium hydroxide, and the like.

The basic reagent is added in a quantity which is sufficient to effect the desired rate and degree of gelling in the solution medium. Preferably, the basic reagent provides a solution pH above about 9, and most preferably a pH in the range between about 9.5–12.

Following formation of the gelled solution, in step(3) the solvent medium is removed from the gelled solution to provide a residual solid-phase spinel precursor composition. One convenient means of stripping the solvent medium is by distillation under vacuum with a roto-vac type of equipment.

The solid-phase spinel precursor is loaded into a suitable refractory vessel and subjected to pyrolysis conditions at about 300°–900° C. in the presence of molecular oxygen (e.g., a molecular oxygen-containing environment such as air). Under pyrolysis conditions, a ferrimagnetic $M_1Fe_2O_4$ spinel is formed from the precursor by means of a solid state reaction.

The organic content of the spinel precursor is combusted during the oxidative pyrolysis period. To reduce the hazard associated with this type of combustion, it is desirable to pyrolyze the spinel precursor in two stages. In the first stage the spinel precursor is pyrolyzed at high temperature under an inert atmosphere such as nitrogen until the evolution of volatile gases has ceased. In this manner, substantially all of the organic content of the spinel precursor composition is eliminated prior to a second stage combustion cycle in the presence of molecular oxygen.

The first stage pyrolysis in an inert environment can be accomplished at 300°–900° C. for a period between about 0.1–5 hours. The second stage pyrolysis in the presence of molecular oxygen can be accomplished at 300°–900° C. for a period between about 0.1–3 hours until the conversion of spinel precursor to $M_1Fe_2O_4$ spinel is completed.

The ferrimagnetic $M_1Fe_2O_4$ spinel composition obtained from the pyrolysis step of the process is in the form of a coarse powder or an agglomerated mass. It is an important aspect of the present invention process that the crystallite and particle size of the $M_1Fe_2O_4$ spinel product is extremely fine, i.e., an average crystallite size less than about 500 angstroms, and an average particle size less than about 1000 angstroms.

The coarse powder spinel obtained directly from the pyrolysis step is readily converted into a fine grain powder by conventional means such as ball-milling. The large particles are physical agglomerates of the inherent fine particles which are readily susceptible to ball-milling or similar particle size reduction procedure.

In a further embodiment, this invention provides a process for the production of a microcrystalline ferrimagnetic spinel which comprises (1) forming an aqueous solution containing alpha-hydroxycarboxylate metal salts in quantities and with metal valences that subsequently yield a spinel composition corresponding to the formula:

$$M_1Fe_2O_4$$

where M is manganese, iron, cobalt, nickel, copper, zinc, cadmium, magnesium, barium, strontium, or any combination thereof; (2) subjecting the aqueous solution to ultrasonic wave energy, while treating the said solution to cause formation of a gelled solution; (3) removing the aqueous medium to provide a solid-phase spinel precursor; and (4) pyrolyzing the spinel precursor in the presence of molecular oxygen at a temperature in the range between about 300°–900° C. to form a $M_1Fe_2O_4$ spinel composition having an average particle size less than about 1000 angstroms.

The use of ultrasonic wave energy and a surfactant additive and other applicable procedures are as previously described.

It is an advantage of this process embodiment that the alpha-hydroxycarboxylate salt content of the step(1) aqueous solution can be above about 50 weight percent, based on total solution weight. The smaller volume of aqueous medium facilitates its removal in step(3) as compared to more dilute solutions.

The step(1) formation of the aqueous solution is achieved readily at room temperature, or with mild heating up to a temperature of about 30°–90° C.

The metal salts preferably are of water-soluble alpha-hydroxycarboxylic acids such as citric acid, malic acid, tartaric acid, glycolic acid, and the like, which contain between about 1–3 hydroxyl groups and 1–3 carboxylic acid groups.

In step(3) of the process, the aqueous medium can be removed by any conventional procedure, such as evaporation, distillation, freeze-drying, and the like. The resultant residual material usually is in the form of a firm gel, depending on the water content that remains associated with the solid mass. If desired, the gel can be heated until it converts into a black char.

The gel or char obtained from step(3), i.e., the solid-phase spinel precursor, is then subjected to pyrolysis in the presence of molecular oxygen, e.g., in the presence of air. The pyrolysis is conducted at a temperature between about 300°–900° C., preferably between about 300°–500° C., for a period of about 0.1–2 hours until the conversion of spinel precursor to $M_1Fe_2O_4$ spinel is completed, and most preferably until the resultant $M_1Fe_2O_4$ spinel is substantially carbon free. Lower calcining temperatures (less than 500° C.) are feasible due to the high reactivity of the gel under pyrolysis conditions. Lower temperatures tend to suppress sintering and grain growth in the resultant spinel product.

The average particle size of the ferrite powder is less than about 1000 angstroms, with essentially no formation of larger particle agglomerates, e.g., particles having a particle size above about 1000 angstroms. In addition, the individual particles are approximately spherical in structure.

The ferrimagnetic spinel compositions produced by the present invention process embodiments are characterized by excellent physical and magnetic properties. Of particular interest is a $M_1Fe_2O_4$ spinel corresponding to a $Ni_{0.7}Zn_{0.3}Fe_2O_4$ composition having an average particle size less than about 1000 angstroms.

The present invention type of microcrystalline ferrite powders are excellent for application in the production of ferrite fibers, e.g., by the spinning of a dope composed of a suspension of the fine ferrite powder in polyvinyl alcohol.

The crystallography and magnetic structures of spinel ferrites is detailed on pages 991-998 in "Introduction to Ceramics" by W. D. Kingery, H. K. Bowen, and D. R. Uhlmann, Second Edition (John Wiley & Sons 1976).

The following Examples are further illustrative of the present invention. The starting materials and other specific ingredients and processing parameters are presented as being typical, and various modifications can be derived in view of the foregoing disclosure within the scope of the invention.

EXAMPLE I

This Example illustrates the production of fine grain metastable tetragonal zirconia in accordance with a present invention process embodiment.

A reaction flask fitted with a reflux condenser, dropping funnel, and stirrer is charged with a solution of zirconium acetylacetonate [940.76 grams (1.93 moles), $Zr(CH_3COCHCOCH_3)_4$] and yttrium acetylacetonate [54.05 grams (0.14 mole), $Y(CH_3COCHCOCH_3)_3$] in three liters of tetrahydrofuran. The solution is heated at reflux for one hour, and then allowed to cool to room temperature. The reaction flask is partially submerged in the bath of laboratory cleaner apparatus with a 40-55 kHz sonic generator.

After the sonic generator has been activated, about 200 milliliters of aqueous ammonium hydroxide (28 weight percent ammonia) are added dropwise to the flask contents. The solvent medium then is concentrated by distillation, until gellation of the solution occurs. The gelled solution is maintained in the ultrasonic field for an additional half hour, and then the gelled solution is stripped of solvent medium to provide a residual mass of precursor solids.

The precursor solids are loaded into alumina boats and pyrolyzed at 400° C. in a nitrogen atmosphere for a period (e.g., 20-30 minutes) sufficient to lower the carbon content of the precursor solids to 1-10 weight percent. The resultant glassy char is pulverized in a ball-mill for about 5 minutes, and then calcined at 400° C. in air for about 20 minutes. This is followed by 20 minutes of calcining at 400° C. in an atmosphere of pure oxygen. The product yield is 247 grams of an off-white zirconia powder, having an average particle diameter of 950-1000 angstroms as determined by BET surface area and scanning electron microscopy. The crystallite size of the zirconia is about 80-140 angstroms.

BET refers to the Brunauer, Emmett, and Teller procedure as described on pages 16-39 of Introduction To Powder Surface Area, by S. Lowell (Wiley Interscience, New York, N.Y., 1979).

Elemental analysis indicates that the zirconia contains 3.5 mole percent of yttria, and the x-ray crystal structure is essentially pure tetragonal phase. There is no x-ray diffraction pattern evidence of monoclinic or cubic crystal structure phases, or of any separate yttria crystal phase.

The tetragonal zirconia powder transforms to the monoclinic phase when energized by ultrasonic input or by ball-milling. This is indicative that the tetragonal zirconia is partially stabilized, i.e., it is in the metastable phase.

Similar results are obtained when the yttrium acetylacetonate is replaced with a selected molar quantity of one of the following metal acetylacetonates:

| Metal | Mole % AcAc* |
| --- | --- |
| magnesium | 6 |
| calcium | 7 |
| strontium | 10 |

* $\dfrac{\text{moles of M(acac)}_n}{[\text{moles of M(acac)}_n + \text{moles Zr(acac)}_4]} \times 100$ Similar results are obtained when the metastabilizing metal $\beta$-diketonate is ytterbium, dysprosium, or cerium acetylacetonate.

When the procedure is repeated with the addition of 50 milliliters of oleic acid to the homogeneous solution of metal $\beta$-diketonates, a metastable tetragonal zirconia powder is obtained which has microspheric particles having an average size of 700-800 angstroms in diameter.

EXAMPLE II

This example illustrates the synthesis of ferrimagnetic $Ni_{0.7}Zn_{0.3}Fe_2O_4$ in accordance with the present invention process.

A 630.2 gram quantity of $Fe(acetylacetonate)_3$ (1.78 moles), and 182.9 grams of $Ni(acetylacetonate)_2 \cdot 2H_2O$ (0.62 mole), and 80.2 grams of $Zn(acetylacetonate)_2 \cdot 2H_2O$ (0.27 mole) are dissolved in 3 liters of tetrahydrofuran contained in a round-bottom flask equipped with a condenser, stirrer, and dropping funnel. The metal acetylacetonate solution is refluxed for one hour with stirring, and then the solution is cooled to room temperature.

The flask is placed in an ultrasonic field in the manner of Example I, and a 500 milliliter quantity of concentrated aqueous ammonia (28%) is added dropwise to the metal acetylacetonate solution over a period of about one hour. The rate of addition is controlled to prevent a boil-over during the exothermic gelling reaction. The gelled solution is maintained in the ultrasonic field for an additional hour.

The solvent is stripped off to provide a solid phase spinel precursor, and the spinel precursor is loaded into an alumina boat and pyrolyzed in a furnace at 500° C. under an inert atmosphere of nitrogen gas. When the evolution of volatile material has ceased (about 15-10 minutes), the resultant char is ground to a fine powder in a ball mill. The fine powder is reloaded into an alumina boat, and the material is pyrolyzed for 15-20 minutes at 600° C. in an environment of molecular oxygen. The resultant brown powder is a ferrimagnetic spinel.

The average particle size as determined by Scanning Electron Microscope measurements is less than about 1000 angstroms. About 110 grams of ferrimagnetic spinel product is obtained, which corresponds to a yield of 50-55 weight percent.

EXAMPLE III

This Example illustrates the synthesis of a nickel-zinc ferrite in accordance with a present invention process embodiment.

Five kilograms of ferric citrate (16.95% by weight iron), 1360 grams of nickel citrate (23.15% by weight nickel), and 480 grams of zinc citrate (31.1% by weight zinc) are dissolved in 5-10 liters of hot water (90° C.). The reaction vessel is a mechanically-stirred beaker, open to the air. After all the citrates are dissolved to form a dark brownish-green solution, the beaker is placed in an ultrasonic field as in Example I.

The water is evaporated to yield first a gelled solution, and then subsequently a residual mass of ferrite precursor solids.

The precursor solids are loaded into alumina boats and pyrolyzed at 500° C. for 15 minutes in a combustion tube purged with air. The product is a brown, ferrimagnetic powder weighing 1625 grams (90.6% of theoretical). The powder is ball-milled for about 0.5 hour to reduce in size any crystallite agglomerates of +200 mesh size.

The composition of the powder is $Ni_{0.7}Zn_{0.3}Fe_2O_4$. The x-ray diffraction pattern indicates that it is a pure phase spinel, without the presence of NiO, ZnO, $\alpha$-$Fe_2O_3$, or $\alpha$-Fe. The particle sizes are of a broad distribution, ranging between about 500-5000 angstroms in diameter, with most of the particles having a diameter of less than about 1000 angstroms in diameter.

When the procedure is repeated with the addition of a 50 gram quantity of polyvinyl alcohol (number average molecular weight, 14,000 g/mole) to the solution of metal citrates, essentially no particle agglomerates are present in the ferrite powder product. Substantially all of the particles are approximately microspheric in shape with a particle size of less than about 1000 angstroms in diameter.

What is claimed is:

1. A process for the production of a microcrystalline metal oxide powder which comprises (1) forming a homogeneous solvent solution containing a solute of zirconium metalorganic compound; (2) subjecting the solution to ultrasonic wave energy, while treating the said solution to cause formation of a gelled solution; (3) removing solvent medium from the gelled solution to provide a residual mass of precursor solids; and (4) pyrolyzing the precursor solids in the presence of molecular oxygen to form a metastable tetragonal zirconia powder having an average particle size less than about 1000 angstroms.

2. A process for the production of microcrystalline metastable tetragonal zirconia which comprises (1) preparing a homogeneous solution by dissolving in a solvent medium zirconium $\beta$-diketonate and a metastabilizing quantity of metal $\beta$-diketonate selected from alkaline earth and lanthanide metal $\beta$-diketonates; (2) subjecting the solution to ultrasonic wave energy, while treating the said solution to cause formation of a gelled solution; (3) removing the solvent medium to provide a residual mass of precursor solids; (4) pyrolyzing the precursor solids in an inert atmosphere at a temperature between about 300°-900° C. until the precursor solids have a carbon content between about 1-10 weight percent, based on the weight of precursor solids; and (5) calcining the precursor solids in the presence of molecular oxygen at a temperature between about 300°-900° C. to yield metastable tetragonal zirconia powder having an average particle size less than about 1000 angstroms.

3. A process in accordance with claim 2 wherein the solution medium in step(1) comprises an organic solvent.

4. A process in accordance with claim 2 wherein the solution medium in step(1) additionally includes a surfactant.

5. A process in accordance with claim 2 wherein the $\beta$-diketonates in step(1) are acetylacetonates.

6. A process in accordance with claim 2 wherein the ultrasonic energy in step(2) has a frequency in the range between about 40-2000 kilohertz.

7. A process in accordance with claim 2 wherein the zirconia powder produced in step(5) is substantially free of monoclinic and cubic phase crystal structures.

8. A process in accordance with claim 2 wherein the zirconia powder produced in step(5) is comprised of microspheric particles.

* * * * *